(12) United States Patent
Barrett et al.

(10) Patent No.: US 11,725,638 B2
(45) Date of Patent: Aug. 15, 2023

(54) ELECTROAERODYNAMIC DEVICES

(71) Applicant: Massachusetts Institute of Technology, Cambridge, MA (US)

(72) Inventors: Steven Barrett, Cambridge, MA (US); Haofeng Xu, Boston, MA (US); Yiou He, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 506 days.

(21) Appl. No.: 16/774,965

(22) Filed: Jan. 28, 2020

(65) Prior Publication Data

US 2020/0386213 A1 Dec. 10, 2020

Related U.S. Application Data (60) Provisional application No. 62/858,510, filed on Jun. 7, 2019.

(51) Int. Cl.
*F03H 1/00* (2006.01)
*B64C 23/00* (2006.01)
(Continued)

(52) U.S. Cl.
CPC ......... *F03H 1/0087* (2013.01); *B64C 23/005* (2013.01); *F03H 1/0037* (2013.01);
(Continued)

(58) Field of Classification Search
CPC ... F03H 1/0087; F03H 1/0037; H05H 1/2418; H05H 1/2406; H05H 1/54; B64C 23/005; B64C 2230/12
See application file for complete search history.

(56) References Cited

U.S. PATENT DOCUMENTS

2006/0150611 A1* 7/2006 Allen .................. H02K 44/00
60/203.1
2006/0272674 A1* 12/2006 Kurunczi ................ B08B 7/00
156/345.43
(Continued)

FOREIGN PATENT DOCUMENTS

CN 104185354 A1 12/2014
EP 30540747 A1 8/2016
(Continued)

OTHER PUBLICATIONS

Abe et al., Experimental Study for Momentum Transfer in a Dielectric Barrier Discharge Plasma Actuator. AIAA J. Sep. 2008;46(9):2248-2256.
(Continued)

*Primary Examiner* — Todd E Manahan
*Assistant Examiner* — Rodolphe Andre Chabreyrie
(74) *Attorney, Agent, or Firm* — Wolf, Greenfield & Sacks, P.C.

(57) ABSTRACT

Electroaerodynamic devices and their methods of operation are disclosed. In one embodiment, ions are formed by dielectric barrier discharge using a time varying voltage differential applied between a first electrode and a second electrode. The ions are then accelerated in a downstream direction using a second voltage differential applied between a third electrode and the first and/or second electrodes, where the third electrode is located down stream from the first and second electrodes. The ions may then collide with naturally charged molecules and/or atoms within a fluid to accelerate the fluid in the downstream to create an ionic wind and an associated thrust.

18 Claims, 5 Drawing Sheets

(51) Int. Cl.
    *H05H 1/24*     (2006.01)
    *H05H 1/54*     (2006.01)

(52) U.S. Cl.
    CPC ........ *H05H 1/2406* (2013.01); *H05H 1/2418* (2021.05); *H05H 1/54* (2013.01); *B64C 2230/12* (2013.01)

(56) References Cited

U.S. PATENT DOCUMENTS

| | | | |
|---|---|---|---|
| 2013/0038199 A1 | 2/2013 | Roy et al. | |
| 2016/0169214 A1* | 6/2016 | Khozikov | B64C 39/02 244/73 R |
| 2017/0359887 A1 | 12/2017 | Griebeler | |
| 2020/0407084 A1* | 12/2020 | Shashurin | F03H 1/0012 |
| 2021/0100089 A1* | 4/2021 | Daykin-Iliopoulos | H05H 1/2406 |
| 2022/0053628 A1* | 2/2022 | Itoh | A61B 18/04 |

FOREIGN PATENT DOCUMENTS

| | | |
|---|---|---|
| WO | WO 2008/136698 A1 | 11/2008 |
| WO | WO 2016/131111 A1 | 8/2016 |

OTHER PUBLICATIONS

Drew et al., First Takeoff of a Flying Microrobot With No Moving Parts. IEEE. Jul. 2017.
Enloe et al., Mechanisms and responses of a single dielectric barrier plasma actuator: Plasma morphology. AIAA J. Mar. 2004;42(3):589-594.
Gibalov et al., The development of dielectric barrier discharges in gas gaps and on surfaces. J Phys D:Appl Phys. Oct. 2000;33:2618-2636.
Khomich et al., In-atmosphere electrohydro dynamic propulsion aircraft with wireless supply onboard. J Electrostatics. Oct. 2018;95:1-12.
Kriegseis et al., Capacitance and power consumption quantification of dielectric barrier discharge (DBD) plasma actuators. J Electrostatics. Aug. 2011;69(4):302-312.
Masuyama et al., On the performance of electrohydro-dynamic propulsion. Proceedings Royal Society A: Mathematical, Physical and Engineering Sciences. Apr. 2013; 469(2154).
Stuetzer. Ion drag pressure generation. J Applied Physics. Jul. 1959;30(7):984-994.
Thomas et al., Optimization of dielectric barrier discharge plasma actuators for active aerodynamic flow control. AIAA J Sep. 2009;47(9):2169-2178.
Xu et al., Flight of an aeroplane with solid-state propulsion. Nature. Nov. 2018;563(7732):532-535.
Extended European Search Report dated May 12, 2023, for Application No. EP20819138.7.

* cited by examiner

ELECTROAERODYNAMIC DEVICES

CROSS-REFERENCE TO RELATED APPLICATIONS

This application claims the benefit under 35 U.S.C. § 119(e) of U.S. provisional application Ser. No. 62/858,510, filed Jun. 7, 2019 the disclosure of which is incorporated by reference in its entirety.

GOVERNMENT LICENSE RIGHTS

This invention was made with Government support under FA8721-05-C-0002 awarded by the U.S. Air Force. The Government has certain rights in this invention.

FIELD

Disclosed embodiments are related to electroaerodynamic devices and related methods.

BACKGROUND

Electroaerodynamic (EAD) devices produce a flow of fluid, and corresponding thrust, using solid-state components and applied electric fields while being nearly silent and producing no combustion emissions. In addition, while not as powerful as combustion or propeller based propulsion, EAD propulsion has also been proven capable of sustaining flight of heavier-than-air airplanes. The most successful EAD propulsion devices thus far have used a direct current (DC) corona discharge to produce ions and the same DC field to accelerate those ions to produce a thrust.

SUMMARY

In one embodiment, an electroaerodynamic device includes a first electrode and a second electrode spaced from the first electrode. The first electrode and the second electrode are configured to form ions between the first electrode and the second electrode. A third electrode is located downstream from the first electrode and the second electrode. The third electrode is configured to accelerate the ions in a downstream direction.

In another embodiment, a method of accelerating a fluid includes: forming ions using dielectric barrier discharge; and accelerating the ions in a downstream direction.

In yet another embodiment, an electroaerodynamic device includes a first electrode, and a second electrode spaced from the first electrode. The first electrode and/or the second electrode is coated with a dielectric material. The electroaerodynamic device also includes: a third electrode located downstream from the first electrode and the second electrode; a first power source configured to apply a first time varying voltage differential between the first electrode and the second electrode; and a second power source configured to apply a second voltage differential between the third electrode and the first and/or second electrodes.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Two figures of merit for an aircraft propulsion system are thrust-to-power and thrust density. High thrust-to-power, which is thrust force per unit input power, corresponds to lower energy storage and power supply requirements and therefore longer range and endurance. High thrust density, which is thrust force per unit span, area, or volume, reduces the size, weight, and aerodynamic drag of the propulsion system. However, the Inventors have recognized that corona discharge electroaerodynamic devices are subject to a performance tradeoff where increasing thrust reduces efficiency (i.e. thrust-to-power ratio). This is due to more ions being generated at higher voltages, but the increased voltage fields applied to accelerate the ions result in reduced efficiency for the overall system. This performance tradeoff is a barrier to practical adoption of electroaerodynamic propulsion systems.

In view of the above, the Inventors have recognized the benefits associated with decoupling the processes used to form and accelerate the ions within an electroaerodynamic device. Specifically, dielectric barrier discharge (DBD) may be used to produce ions within an electroaerodynamic device instead of a corona discharge. A separate voltage differential, and corresponding electric field, may then be used to accelerate the produced ions in a desired direction, such as a downstream direction, to produce a flow of fluid through a system, and in some applications a corresponding thrust which may be utilized.

In one embodiment, an electroaerodynamic device forms ions using dielectric barrier discharge. The ions are then accelerated in a downstream direction. The accelerated ions may collide with neutral molecules and/or atoms as they travel in the downstream direction imparting at least a portion of their momentum to the molecules and/or atoms to accelerate the overall fluid within the device in the downstream direction as well. This may result in the generation of an ionic wind where the fluid present in the electroaerodynamic device flows in the downstream direction through the electroaerodynamic device.

In some embodiments, the desired dielectric barrier discharge and ion acceleration may be provided using first, second, and third electrodes that interact with one another. Specifically, a first and second electrode may be spaced from one another at a first location within the electroaerodynamic device. A time varying voltage differential may be applied between the first and second electrodes such that the first and second electrodes form ions there between due to dielectric breakdown of the fluid gap between the electrodes. For example, when positioned in atmospheric air, the gasses between the electrodes may be ionized during dielectric barrier discharge between the electrodes. Thus, the first and second electrodes may function as a dielectric breakdown discharge (DBD) electrode and corresponding emitter electrode where the ions are produced such that the two electrodes may be operated together to form the desired ions. In certain embodiments, either one, or both, of the first and second electrodes may be coated with a dielectric material to avoid arcing between the first and second electrodes when the desired operational voltage differential is applied. The third electrode may be positioned at a location downstream from the first and second electrodes. The third electrode may be held at a voltage such that a voltage differential, and corresponding electric field, between the third electrode and the first and second electrodes is sufficient to accelerate the formed ions in a downstream direction towards the third collector electrode.

In some embodiments, it may be desirable for the electric fields used to separately perform dielectric barrier discharge and to accelerate the resulting ions to be oriented in different directions. For example, the electric field extending between the first and second electrodes for dielectric barrier discharge (e.g. the DBD and emitter electrodes) may be oriented in a first direction and a second electric field extending between a third collector electrode and the first and/or second electrodes may extend in a second direction that is different from the first direction. In some embodiments, the first and second directions may be angled relative to one another including orientations in which the first and second electric fields are substantially orthogonal to one another. However, embodiments in which the first and second electric fields are oriented in directions parallel with one another are also contemplated as the disclosure is not limited in this fashion.

Depending on the particular application, it should be understood that the electroaerodynamic devices described herein in the corresponding electrodes may be any appropriate size and may be arranged in any appropriate manner relative to one another. Examples of possible dimensions, shapes, and arrangements are provided below. However, it should be understood that the disclosed electrodes are not limited to only the disclosed electrode configurations as the disclosure is not limited in this fashion.

In one embodiment, a spacing between the first and second electrodes (i.e. the DBD and emitter electrodes) of an electroaerodynamic device used to form ions by dielectric barrier discharge may be greater than or equal to 500 µm, 750 µm, 1 mm, and/or any other appropriate spacing depending on the desired application. Correspondingly, the distance between the first and second electrodes may be less than or equal to 1.5 mm, 1.25 mm, 1 mm, and/or any other appropriate spacing. Combinations of the foregoing are contemplated including, for example, a spacing between the first and second electrodes that is between or equal to 500 µm and 1.5 mm.

Similar to the above, a spacing between the first and/or second electrode (i.e. the DBD and/or emitter electrode) with the third downstream collector electrode may be greater than or equal to 50 mm, 100 mm, 200 mm, and/or any other appropriate spacing. The spacing between the first and/or second electrode with the third downstream collector electrode may also be less than or equal to 300 mm, 200 mm, 100 mm, and/or any other appropriate spacing. Combinations of the foregoing are contemplated including, for example, a distance from the first and/or second electrodes to the third electrode may be between or equal to 50 mm and 300 mm.

The first and second electrodes of an electroaerodynamic device that are configured for dielectric barrier discharge to form ions during operation (i.e. the DBD and/or emitter electrodes) may have any appropriate size. For example, the electrodes may have a maximum transverse dimension (e.g. a diameter) that that is greater than or equal to 0.1 mm, 2 mm, 0.5 mm, and/or any other appropriate size. Correspondingly, the maximum transverse dimension may be less than or equal to 2 mm, 1.5 mm, 1 mm, and/or any other appropriate size. Combinations of the foregoing are contemplated including, for example, a maximum transverse dimension of a first and/or second electrode that is between or equal to 0.1 mm and 2.0 mm.

The third collector electrode of an electroaerodynamic device that is configured to generate an electric field to accelerate the ions formed within a device may also have any appropriate size for a desired application. For example, the collector electrode may have a maximum transverse dimension (e.g. a diameter) that is greater than that of the first and/or second electrodes in some embodiments. For example, a transverse dimension of a collector electrode may be greater than or equal to 5 mm, 10 mm, 20 mm, and/or any other appropriate size. The maximum transverse dimension of the collector electrode may also be less than or equal to 50 mm, 40 mm, 30 mm, and/or any other appropriate size. Combinations of the foregoing are contemplated including, for example, a maximum transverse dimension of the collector electrode that is between or equal to 5 mm and 50 mm.

In embodiments where elongated electrodes are used, any appropriate longitudinal length for the electrodes (e.g. a span of the electrodes within a device) may be used. For example, the electrodes may have longitudinal lengths that are greater than or equal to 100 mm 200 mm, 300 mm, and/or any other appropriate length. Correspondingly, the longitudinal lengths of the electrodes of a device may be less than or equal to 1000 mm, 750 mm, 500 mm, and/or any other appropriate length. Combinations of the foregoing are contemplated including, for example, a longitudinal length of the electrodes of a device may be between or equal to 100 mm and 1000 mm.

The various electrodes in an electroaerodynamic device may also have any appropriate size and/or shape for a desired application. For example, electrode shapes may include, but are not limited to, spheres, plates, wires, cylinders, tubes, prisms, and/or any other appropriate shape. In some instances, the one or more electrodes, and/or all of the electrodes, of a device may exhibit an elongated shape in the form of wires, cylinders, tubes, prisms, and/or other appropriate elongated shapes where a longitudinal length of the shape may be significantly longer than a maximum transverse dimension of the electrode taken perpendicular to the longitudinal axis of the shape. These types of elongated shapes may exhibit several advantages. Specifically, these types of structures may exhibit: simplified manufacture (e.g. coating of a wire or cylinder); reduced weights; and lower drag to surface area ratios to name a few advantages compared to other types of shapes. Electrodes exhibiting these elongated shapes may also be arranged such that they extend in parallel directions to one another which may help provide uniform ion generation and thrust within the resulting electroaerodynamic device. For example, in some embodiments, the first and second electrodes used to perform dielectric barrier discharge within an electroaerodynamic device may be oriented parallel to one another and the third collector electrode may be spaced from and oriented parallel to the first and second electrodes.

While various dimensions and shapes of the various electrodes are noted above, it should be understood that any appropriate size, shape, spacing, and/or other dimension or characteristic for the different electrodes may be used. This may include ranges of the various dimensions described above that are both greater than and less than those noted above as the disclosure is not limited to any particular electrode construction or arrangement.

The first and/or second electrodes (i.e. a DBD electrode and emitter electrode) used to perform dielectric barrier discharge to form ions within an electroaerodynamic device may be made from any appropriate material and/or combination materials. For example, in one embodiment, a first dielectric barrier discharge electrode may be coated with a dielectric material on at least the surfaces oriented towards the second emitter electrode. In some embodiments, the exposed surfaces of the first electrode may be completely coated with the dielectric material. The second electrode may be an uncoated emitter electrode that is substantially free of the dielectric material in some embodiments. However, instances in which the second electrode is coated with a dielectric material on at least a surface oriented towards the first electrode, and in some embodiments on all of the exposed surfaces of the second electrode, are also contemplated. Thus, either one or both of the first and second electrodes used to perform dielectric barrier discharge may be at least partially coated with a dielectric material to avoid arcing between the electrodes during dielectric barrier discharge.

It should be understood that any appropriate combination of dielectric material, coating thickness, and electrode spacing may be used for a desired application such that the voltages applied between the electrodes for performing dielectric barrier discharge is capable of ionizing the fluid, such as an atmospheric gas, present between the electrodes while avoiding electrical breakdown and arcing between the electrodes themselves. For example, dielectric materials with larger dielectric constants may be coated with smaller thicknesses and dielectric materials with smaller dielectric constants may be coated with larger thicknesses to avoid dielectric breakdown and arcing between the dielectric barrier discharge electrodes during ion formation. Appropriate dielectric materials, may include but are not limited to, various fluoropolymer compounds (Teflon fluorinated ethylene propylene (FEP), Teflon Perfluoroalkoxy alkanes (PFA), Tefzel ethylenetetrafluoroethylene (EFTE), and others), glasses, fiberglass composites (e.g. Garolite), polyimides (e.g. Kapton tape and/or polyimide coatings), and/or any other appropriate dielectric material. Appropriate conductors that may be used to form the various electrodes of an electroaerodynamic device may correspond to any appropriately conductive material capable of conducting the desired voltages and currents. This may include conductive materials such as stainless steel, copper, aluminum, tin, metal alloys, carbon, and/or any other appropriate conductive material.

Any appropriate power source may be used to apply a desired voltage and current to the first and second electrodes (i.e. a DBD and emitter electrode) of an electroaerodynamic device used to form ions by dielectric barrier discharge. In some embodiments, the power supply may apply a time varying voltage differential between the first and second electrodes to form a time varying electric field there between. The time varying voltage differential may be applied using either unipolar voltages, bipolar voltages, and/or combinations of the foregoing. Additionally, the time varying voltage differential may be applied using any appropriate wave profile. For example, the power source may apply square waves, sinusoidal waves, saw tooth waves, and/or any other appropriate time varying profile for the applied voltage differential between the electrodes. The time varying voltage differential may also be applied using any appropriate frequency including frequencies greater than or equal to 0.5 kHz 1 kHz, 10 kHz, 50 kHz, or any other appropriate frequency. The frequencies may also be less than or equal to 150 kHz, 100 kHz, 50 kHz, and/or any other appropriate frequency. Combinations of the foregoing are contemplated including frequencies of a time varying voltage differential that are between or equal to 0.5 kHz and 150 kHz. The magnitude of the applied voltage differential during nominal operation of the device may also be between or equal to 1 kV 2 kV, 5 kV, and/or any other appropriate voltage differential. The voltage differential may also be less than or equal to 10 kV, 5 kV, 2 kV, and/or any other appropriate voltage differential. Combinations of the foregoing are contemplated including voltage differentials between the first and second electrodes that are between or equal to 1 kV and 10 kV. Of course, while specific types of time varying voltage differentials with different frequencies and magnitudes are described above, it should be understood that any appropriate time varying voltage differential capable of forming ions by dielectric breakdown discharge may be used as the disclosure is not limited to only those specific ranges and types of voltage differentials described above.

In addition to the above, any appropriate power source may be used to apply a voltage differential to accelerate ions in a downstream direction within an electroaerodynamic device. For example, in at least one mode of operation, e.g. during fluid flow and/or thrust generation, a second power source may apply a voltage differential, and corresponding electric field, between a third collector electrode the first and second electrodes (e.g. a DBD and emitter electrode) of a device. In some embodiments, this voltage differential and electric fields may be substantially constant in regards to time. The third collector electrode may be located downstream from the first and second electrodes. In one such embodiment, the power source may be a direct current (DC) power source that applies a desired constant voltage differential. However, instances in which an alternating current (AC) power source is used where an average voltage differential is applied to accelerate the ions is also contemplated as the disclosure is not limited in this fashion. Appropriate voltage differentials to accelerate the ions during nominal operation may include voltage differentials greater than 10 kV, 20 kV, 50 kV, and/or any other appropriate voltage differential. The applied voltage differentials may also be less than or equal to 120 kV, 100 kV, 50 kV, and/or any other appropriate voltage differential. Combinations of the foregoing are contemplated including, for example, a voltage differential applied between a third collector electrode and the first and second electrodes (e.g. the DBD and emitter electrodes) may be between or equal to 10 kV and 120 kV. Of course, embodiments in which voltage differentials both less than and greater than those noted above are used are also contemplated as the disclosure is not so limited.

Due to ion generation and ion acceleration being controlled by two separate power sources, it is possible to throttle the operation of the disclosed electroaerodynamic devices using either power source. For example, a magnitude and/or frequency of a time varying voltage differential applied between a dielectric breakdown discharge electrode and emitter electrode to form ions may be changed with regards to magnitude, frequency, and/or wave profile to either increase or decrease the generation of ions within the device. In one such embodiment, a magnitude and/or frequency of the applied time varying voltage differential may be increased to increase the generation of ions to correspondingly increase the thrust. Alternatively, the magnitude and/or frequency of the time varying voltage differential may be decreased to decrease the generation of ions and correspondingly decrease the thrust. Alternatively, a magnitude of a voltage differential applied between a collector electrode of a device and the DBD and emitter electrodes of a device may be changed to vary the accelerating forces applied to the ions. For instance, reducing a magnitude of the applied accelerating voltage differential may reduce the accelerating forces applied to the ions, and thus reduce the resulting thrust. In contrast, increasing the magnitude of the applied accelerating voltage differential may increase the accelerating forces applied to the ions, and thus increase the resulting thrust. Of course, it should be understood that the operation of either one or both of the power sources may be controlled to vary a thrust or flow of a gas through an electroaerodynamic device as the disclosure is not limited to only controlling one of the power sources.

The disclosed electroaerodynamic devices may be used for a number of different applications. For example, an electroaerodynamic device as described herein, may be used to generate propulsive forces in any appropriate fluid without any moving parts. Examples of such applications may include use as a thruster in an aircraft (e.g. a quadcopter, an airplane, etc.). The disclosed electroaerodynamic devices may also be used as solid-state actuators for applications in pumping, heat transfer, flow control, and/or any other application where it is desirable to accelerate a fluid in a particular direction. Appropriate types of fluids that any of the disclosed electroaerodynamic devices may be operated in may include, but are not limited to, atmospheric air, gases, liquids (e.g. silicon oil, kerosene, insulating liquids, and other appropriate liquids), and/or any other appropriate where at least a portion of the fluid is capable of being ionized and accelerated to create a flow of the fluid through any of electroaerodynamic devices disclosed herein.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1:
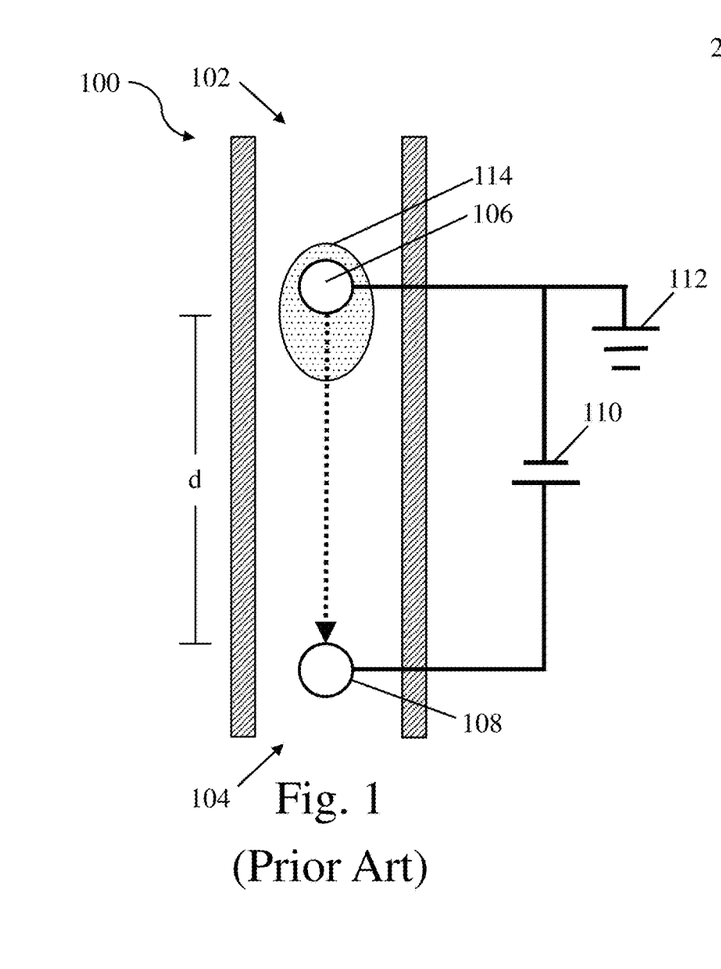
FIG. 1 is a schematic representation of one embodiment of an electroaerodynamic device using corona discharge to form ions.

FIG. 1 depicts one embodiment of a prior corona discharge thruster 100. The corona discharge thruster includes an inlet 102 and an outlet 104 located downstream from the inlet. The device also includes a first emitter electrode 106 and a second collector electrode 108 disposed downstream from the emitter electrode. The electrodes are spaced from one another by a distance d. Both electrodes are disposed between the inlet and the outlet of the device. Any appropriate construction of the electrodes may be used including, for example, a pin-to-mesh or wire-to-cylinder geometry. The emitter electrode and collector electrode are electrically connected to one another through a power source 110 that is configured to apply a voltage differential between the electrodes. In the depicted embodiment, the output of the power source and the corona discharge electrode may be connected to the same electrical potential which is depicted as ground 112 in the figure, though instances in which the common potential is not a ground potential are also contemplated. During operation, the power source applies a voltage differential between the emitter electrode and the collector electrode. While the power supply has been illustrated as a negative power supply, a positive power supply may also be used as the disclosure is not limited to any particular type of voltage differential applied to the system. At a sufficiently high voltage differential between the electrodes, a self-sustaining gas discharge 114 which generates a supply of electrons and ions is formed at the first emitter electrode. For a positive corona, where the emitter electrode is at a positive potential relative to the collector electrode, positive ions travel under the applied electric field toward the negative electrode (i.e. the collector) as indicated by the arrow. Again, a positive power supply may also be used. In either case, as the ions travel from the emitter to the collector, the ions collide with neutral molecules and/or atoms and impart at least a portion of their momentum to the bulk fluid. This process generates an ionic wind corresponding to a flow of fluid through the device in the downstream direction and a corresponding thrust force directed in the upstream direction opposite the ion and fluid flow.

In the above embodiment, the voltage differential applied to form the corona discharge for ion generation is the same voltage differential used to accelerate the ions for thrust generation. Using the same electric field for both processes reduces the engineering complexity and the weight of the power system. Additionally, such a device has been used to power both free and tethered flight. However, as noted previously, the thrust of such a system increases with higher applied voltage differential (and equivalently higher average electric field strengths), while thrust-to-power decreases with higher average electric field strength. This limits the performance of typical corona discharge based electroaerodynamic devices.

Figure 2:
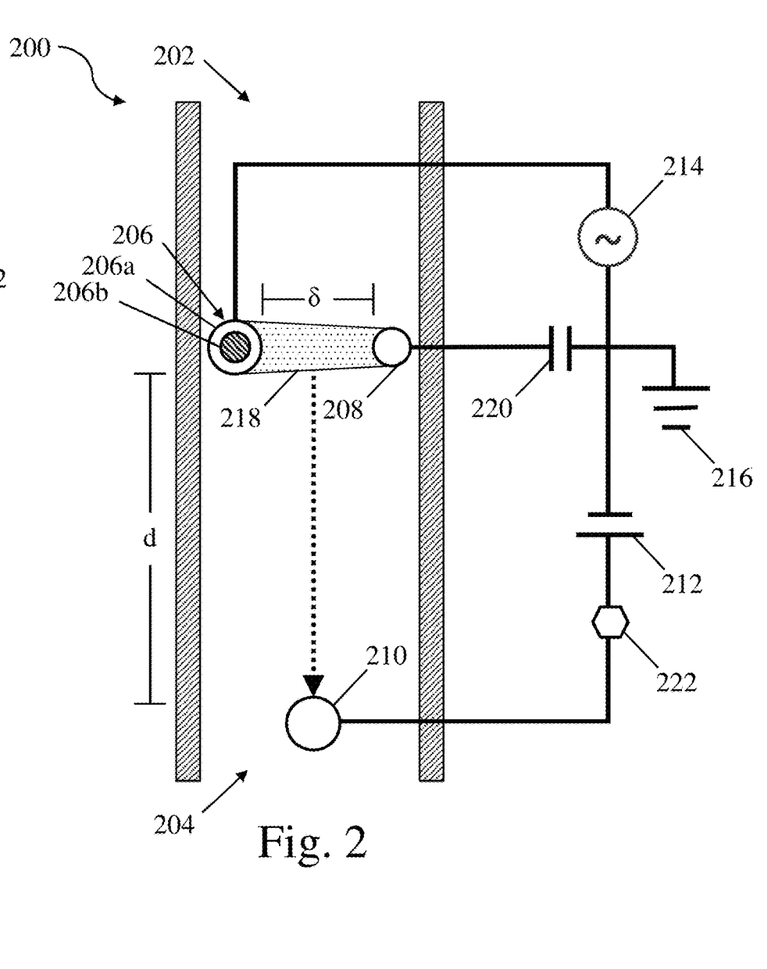
FIG. 2 is a schematic representation of one embodiment of an electroaerodynamic device using dielectric barrier discharge to form ions.

FIG. 2 depicts an embodiment of an electroaerodynamic device 200 that uses dielectric barrier discharge to form ions during normal operation. In the depicted embodiment, the device includes an inlet 202 that is in fluid communication with a fluid source at an upstream location and an outlet 204 located at a location downstream from the inlet. In some embodiments, the inlet and outlet may be coupled to an external atmosphere surrounding the electroaerodynamic device. However, embodiments in which the fluid source in fluid communication with the inlet is an internal fluid source such as a fluid reservoir are also envisioned. Additionally, the outlet does not necessarily need to be in fluid communication with an external atmosphere. For instance, the outlet may be connected to an internal channel along which the accelerated fluid may flow. Thus, it should be understood that the inlet and/or outlet of a device may be connected to any desired structure and/or environment and may have any appropriate construction as the disclosure is not limited to any particular application or device where it is desirable to produce a flow of fluid.

To perform the desired dielectric barrier discharge, the device may include a first electrode 206 and a second electrode 208 that are spaced from one another by a distance δ. While the electrodes have been depicted as being spaced from one another in a lateral direction relative to a longitudinal axis of the device, the first and second electrode may be spaced from one another in any appropriate direction as the disclosure is not limited in this fashion. The first electrode may correspond to a dielectric barrier discharge electrode and the second electrode may correspond to an emitter electrode in the depicted configuration such that a dielectric barrier discharge 218 is formed between the two electrodes to ionize the fluid within the device during nominal operation. The device includes a third collector electrode 210 spaced a distance d downstream from the first and/or second electrodes such that each of the electrodes are disposed between the inlet 202 and outlet 204 of the device. The third collector electrode is configured to apply a voltage differential, and corresponding electric field, relative to the first and second electrodes to accelerate the ions in the downstream direction. The electrodes are disposed between the inlet and outlet of the device as shown in the figure. Similar to the above embodiment described in relation to FIG. 1, as the ions move in the downstream direction towards the third collector electrode, the ions collide with neutrally charged molecules and/or atoms within the fluid (e.g. an atmospheric gas) imparting at least a portion of the momentum of the ions to the neutrally charged molecules and/or atoms in the fluid. This generates an ionic wind corresponding to a flow of the fluid in the downstream direction such that the fluid from the surrounding environment may enter the inlet 202 of the device, flow through the device, and exit through the outlet 204.

In the depicted embodiment, a first power source 212 is electrically connected to the third collector electrode 210 and a common electrical potential represented as a ground 216 in the figure. While the first power source has been illustrated as a negative power supply, it should be understood that any appropriate power supply including a positive power supply may be used as the disclosure is not limited to the specific magnitude or directionality of the voltage differentials applied to the electrodes. In the depicted embodiment, the second electrode 208 and a second power source 214 may also be electrically connected to the ground or other common potential. Separately, the second power source is electrically connected to the first electrode 206. Thus, a first time varying voltage $V_{AC}$ may be applied to the first electrode relative to the second electrode and ground or other common voltage potential. A second voltage $V_{DC}$, which may be a substantially constant voltage, may be applied to the third collector electrode relative to the ground or other common potential. Additionally, a ground voltage $V_G$ may be applied to the second electrode by the ground or other common potential, though embodiments in which a capacitor such as capacitor 220 is electrically connected in series between the second electrode and the ground or other common potential are also contemplated, in which case, the voltage applied to the second electrode would be a combination of $V_G$ and a voltage of the capacitor $V_{Cap}$. In view of the above, a time varying voltage differential applied between the first and second electrodes causes the fluid located between the electrodes to ionize via dielectric barrier discharge 218 as the voltage cyclically changes during operation. This voltage differential may correspond to a difference between the voltage applied to the first electrode $V_{AC}$ by the second power source and the combination of the ground voltage $V_G$ and the capacitor voltage $V_{Cap}$ where present. Given the large voltage difference between the third collector electrode and the first and second electrodes used to accelerate the ions, the voltage differential used for accelerating the ions may be approximated as the second voltage $V_{DC}$ or an average of the difference between the voltage of the third electrodes with the first and second electrodes. However, a more specific voltage differential between the first electrode and the third collector electrode may correspond to the difference between $V_{AC}$ and $V_{DC}$. Similarly, the voltage differential between the second electrode and the third collector electrode may correspond to the difference between $V_{DC}$ and the combination of the ground voltage $V_G$ and capacitor voltage $V_{Cap}$.

In some embodiments, it may be desirable to actively control and/or vary a flow of fluid through an electroaerodynamic device. In such an embodiment, a controller, not depicted, may be operatively connected to the first and second power sources 212 and 214. Additionally, one or more sensors such as a voltage and/or current sensor 222 and a potential or voltage sensor, such as capacitor 220, may be included to sense one or more operating parameters of the electroaerodynamic device. For example, the voltage and/or current sensor may be positioned between the first power source and the third collector electrode 210 to sense a current and/or voltage provided by the first power source to the third collector electrode. While not illustrated, a similar sensor may be included between the second power source and the first electrode 206 to sense a current and/or voltage associated with the time varying voltage differential applied to the first electrode. The capacitor 220 in the depicted embodiment may be use to sense a charge potential on the second electrode 208 due to the buildup of charge during operation, though embodiments in which a shunt resistor or other similar sensing arrangement is used are also contemplated. In either case, the sensed operating parameters of the device may be output to, and received by, a processor of the controller. The controller may include memory associated with the processor in the form of a non-transitory computer readable media that includes processor executable instructions that when executed use the sensed operating parameters to control operation of the first and/or second power sources to control operation of the device. For example, a closed and/or open feedback loop may be used to control the voltages and/or currents applied to the various electrodes during steady-state operation. Alternatively, if it is desired to change a thrust and/or flow of fluid provided by the electrodynamic device, the processor may vary a voltage, frequency, and/or current provided by the first and/or second power sources to the associated electrodes to change either the rate of ion generation and/or the acceleration forces applied to the ions during operation. In either case, multiple operating parameters may be sensed and controlled to control operation of the device in contrast to prior systems where the only operating parameter that could be controlled was a single voltage differential applied to both generate and accelerate ions during operation.

Example: Performance of a Decoupled Thruster

The current-voltage characteristic of a corona discharge is limited by two processes: first, a minimum electric field at the emitter for ionization; and second, a maximum space charge density arising from the self-limiting nature of electric-field-driven charge flow. In contrast, in the currently disclosed electrodynamic devices, the generation and acceleration of ions are decoupled from one another where the ions are produced by an independent ion source. This removes the first constraint of a minimum ionization field at the emitter, and permits a "choked" solution where the electric field at the emitter may be assumed to go to zero. Without wishing to be bound by theory, a decoupled thruster as described herein may produce more current, and hence thrust, than a corona discharge thruster with the same geometry and at the same applied voltage. Since the applied voltage determines the thrust-to-power, a decoupled thruster may produce more thrust at the same thrust-to-power (or equivalently the same thrust at higher thrust-to-power by lowering the applied voltage).

The independent ion source used in the currently disclosed electrodynamic device is a dielectric barrier discharge (DBD). DBD was chosen for its ability to produce a non-equilibrium atmospheric plasma at relatively low power. In one implementation an alternating current (AC) electric field oriented orthogonally to the DC thrust-producing electric field was used to generate the DBD similar to the system shown in FIG. 2. This concept was used for thrust generation and optimized as detailed below.

Systems similar to those illustrated in FIGS. 1 and 2 were constructed. The electrodes were designed using a lightweight and low-drag wire-to-wire electrode design which may be suitable for airplane propulsion. In both thrusters, the emitter electrode was a tungsten wire with a diameter of 0.254 mm, the collector electrode was an aluminum tube with a diameter of 12.7 mm, 25.4 mm, or 38.1 mm. The gap spacing between the emitter and collector was varied between 50 mm and 150 mm (measured from the top of the collector to the bottom of the emitter), and the span of the electrodes (into the page) was 500 mm. In the exemplary thruster, the DBD electrode was spaced 1 mm from the emitter electrode, forming a DBD field orthogonal to the DC field between the emitter and the collector. A fluorinated ethylene propylene (FEP) insulated high voltage wire was used as the DBD electrode with a conductor diameter of 0.4 mm and an overall diameter of 1.02 mm. The FEP insulation acted as the dielectric barrier. This DBD electrode system was significantly lighter than the plate electrodes or surface electrodes found in other applications. A charge measurement capacitor was placed in series with the DBD to measure DBD power draw. As detailed below, a parametric exploration of DBD voltage and frequency was conducted using the constructed devices to identify the operational regimes for the disclosed devices.

Figure 3:
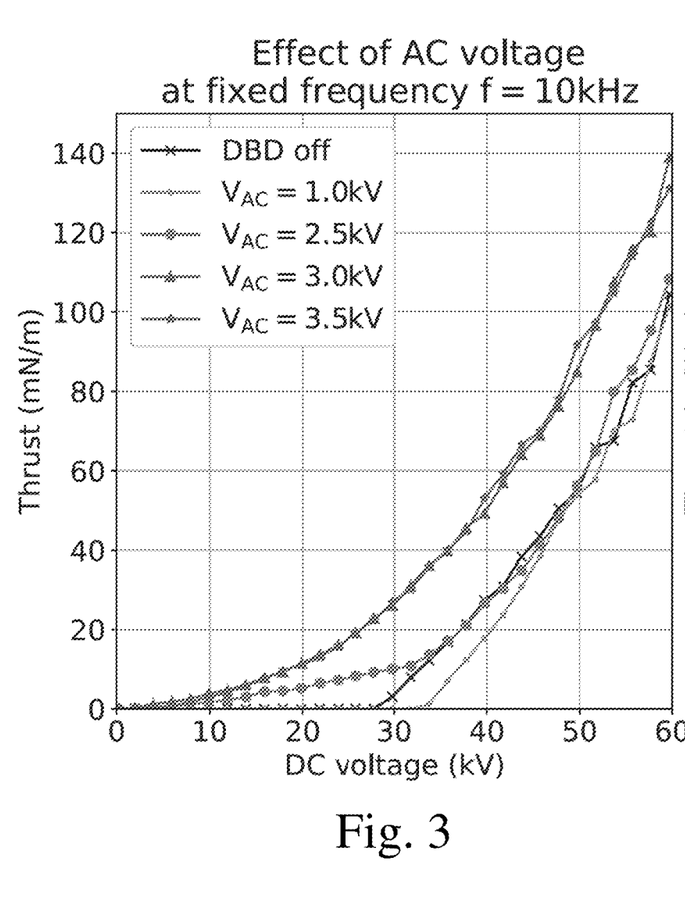
FIG. 3 is a graph of thrust versus the direct current acceleration voltage for different dielectric barrier discharge voltages at a fixed frequency of 10 kHz.
Figure 4:
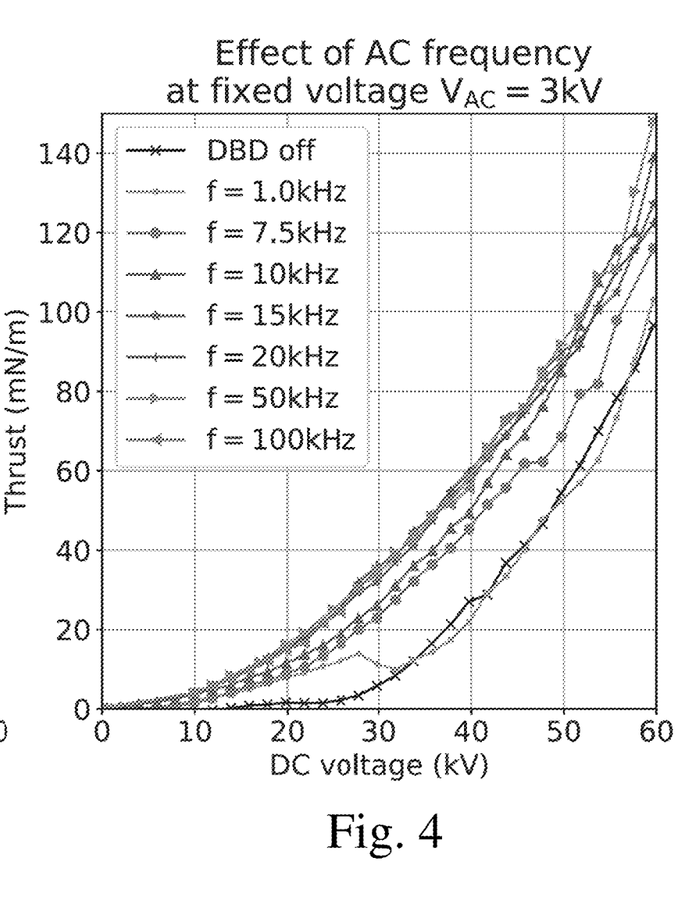
FIG. 4 is a graph of thrust versus the direct current acceleration voltage for a fixed dielectric barrier discharge voltage applied at different frequencies.

The thrust was measured for the decoupled thruster at different applied voltages over a range of DBD voltages and frequencies to explore the effect of the changing DBD parameters. As shown in FIGS. 3 and 4, the thrust produced by the decoupled thruster vs. DC voltage was measured at different DBD voltages (AC amplitude) and frequencies. In FIG. 3, the experiments were performed with a DC gap spacing of 100 mm and a collector diameter of 12.7 mm with a fixed frequency of the DBD of 10.0 kHz. Once the DBD voltage was above the inception voltage, in this case 2.5 kV, there was a significant increase in the thrust compared with that of the baseline corona discharge. In FIG. 4, the voltage of the DBD was fixed at 3 kV. When the DBD frequency was above certain threshold, there was a significant increase in the thrust compared with that of the baseline corona discharge.

Based on the measured performance, when the DBD is turned off, the decoupled thruster performs like a corona discharge thruster. In other words, without an independent ion source, the device reverts to ion production via a corona discharge. The inception voltage of the "DBD off" cases are clearly visible in FIG. 3, and is consistent with that of a corona discharge. Thus, when the voltage of the DBD ion source is increased and plasma inception of the DBD occurs (between 2.5 kV and 3.0 kV), the thrust at the same DC applied voltage is increased. Similarly the thrust is increased for higher DBD frequencies as shown by FIG. 4. For example, at an applied DC voltage of 60 kV, the thrust increased by 40% over the corona discharge. The percentage increase was higher at lower DC voltages.

Without wishing to be bound by theory, the above-noted increase in thrust may be dependent on the use of a threshold AC voltage and a threshold AC frequency for operation of the DBD based system. Below these threshold operating parameters, there may be no increase in thrust as compared to a corona discharge based system. For example, at low AC voltages, the DBD is below the plasma inception voltage and no ions are produced, and at low AC frequencies, the DBD does not produce enough ions. For this particular system, the threshold AC voltage was around 3.0 kV and the threshold AC frequency was approximately 10 kHz. When the DBD voltage and frequency increased beyond these thresholds, the thrust did not further increase. The thrust generation may have instead become limited by space charge density instead of ion production.

In view of the above two operating regimes for the currently disclosed electrodynamic devices were identified. Specifically, in a first operating regime, the thrust generation is limited by the rate of ion production, and in a second operating regime, the thrust generation is limited by space charge density. The latter occurs at higher DBD voltages and frequencies. Since increasing ion production increases the power draw of the DBD, it is desirable to operate on the threshold between the two regimes where the DBD produces just enough ions to be in the space charge limited regime. Note that the specific thresholds identified here are dependent on the particular system and geometries tested, and it is expected that different systems will exhibit different corresponding thresholds.

Figure 5:
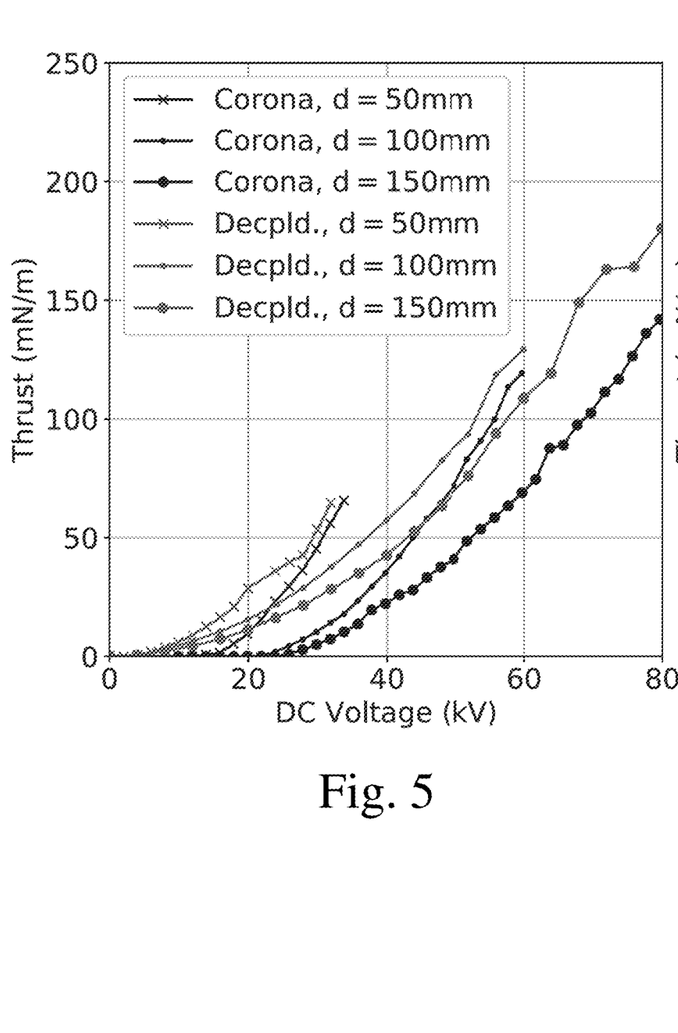
FIG. 5 is a graph of thrust versus the direct current acceleration voltage for a corona discharge thruster and a dielectric barrier discharge thruster.
Figure 6:
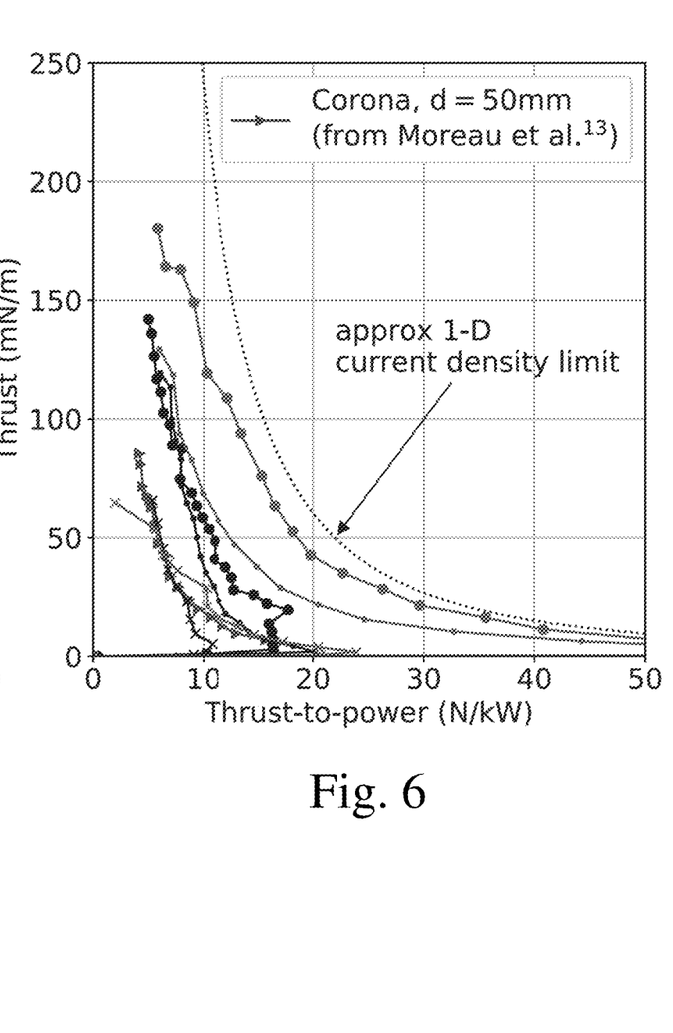
FIG. 6 is a graph of thrust and thrust to power for a corona discharge thruster and a dielectric barrier discharge thruster.

The systems were tested at the threshold DBD voltage of 3 kV and frequency of 10 kHz where the thrust and thrust-to-DC-power performance was quantified as a function of DC gap spacing, see FIGS. 5 and 6. As seen in the figures, the disclosed devices exhibited an increased thrust as compared to a typical corona discharge device operated at the same voltage. This performance increase was observed for different gap spacings ranging from 50 mm to 150 mm. Thus, the currently disclosed systems are capable of generating the same thrust using a lower applied voltage, which reduces the average accelerating electric field and improves the thrust-to-power. FIG. 6, which relates the thrust and thrust-to-power, shows that the decoupled thruster is able to achieve higher thrust-to-power ratio at every thrust level compared to the corona discharge thruster. In particular, it is able to more closely approach the theoretical one-dimensional current density limit given above.

Figure 7:
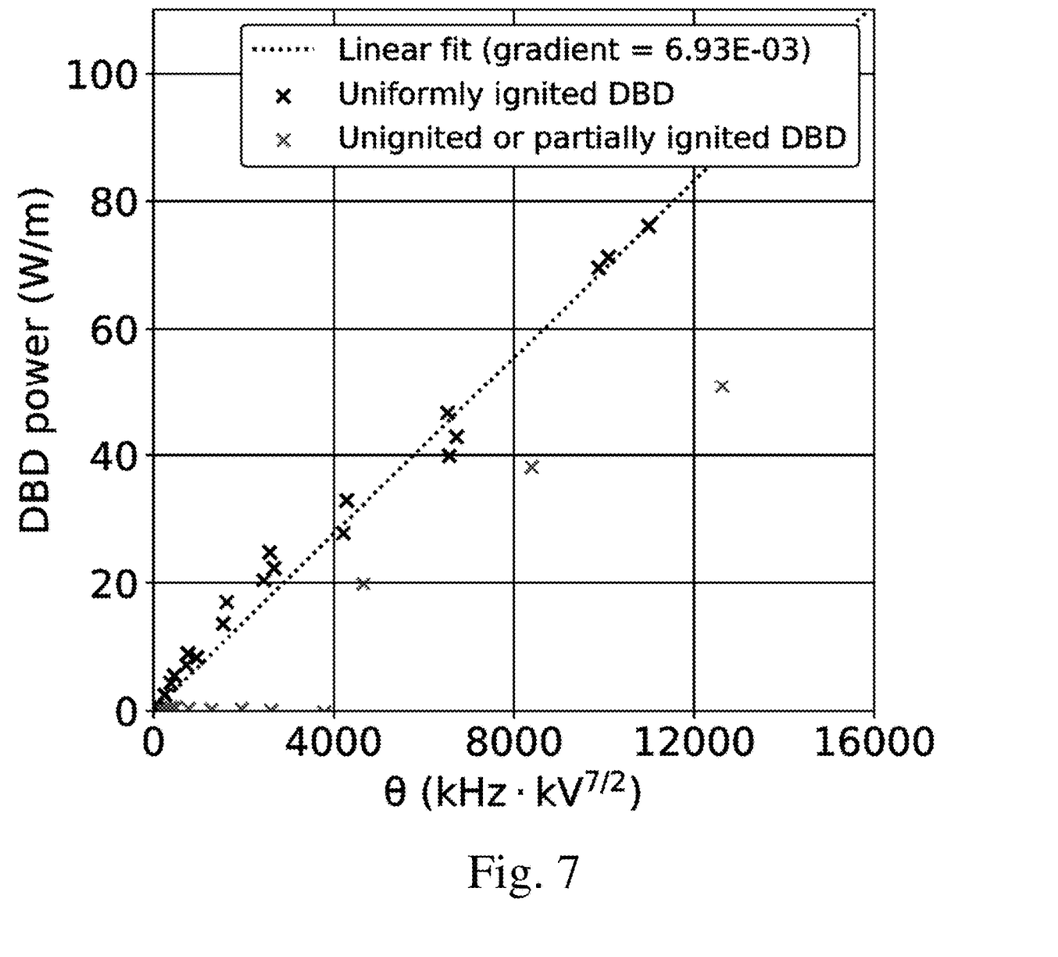
FIG. 7 is a graph of the relationship between dielectric barrier discharge power and the applied dielectric barrier discharge voltage and frequency.

The thrust and thrust-to-power results in FIGS. 5 and 6 do not include the power used to drive the DBD, which does incur a power draw penalty. Without wishing to be bound by theory, the power draw of a DBD is a function of the applied AC waveform which may include considerations such as the voltage, frequency, waveform shape, and the electrode geometry. Assuming a fixed DBD geometry and waveform shape, FIG. 7 shows the measured DBD power against θ, where:

$$\theta = f V_{AC}^{7/2}$$

f is the frequency and $V_{AC}$ is the amplitude of the voltage differential. For the range of DBD voltages from 0 kV to 3.5 kV and frequencies from 1 kHz to 100 kHz, it was found that the DBD power per meter span, P, for the tested geometry scaled as.

$$P \propto f V_{AC}^{7/2}$$

Figure 8:
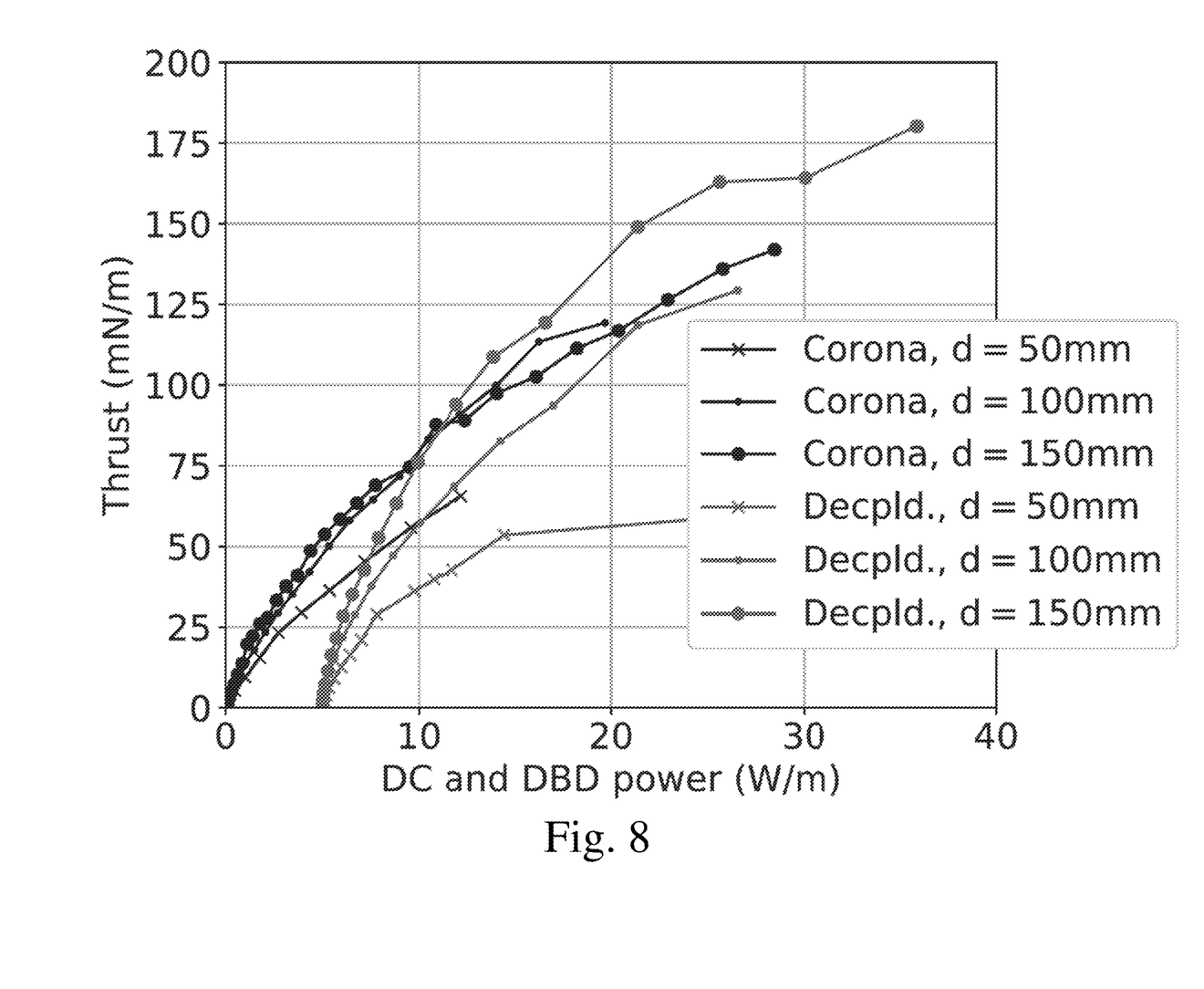
FIG. 8 is a graph of thrust versus total power for a corona discharge thruster and a dielectric barrier discharge thruster.

At a DBD voltage of 3 kV and frequency of 10 kHz, the power draw of the DBD was 5.4 W/m. This is the penalty in power draw that the disclosed design incurs versus the corona discharge thruster. Including this power draw penalty, it was found that the currently disclosed decoupled thruster was not advantageous at lower thrust levels, see FIG. 8. When the DC power draw is low, the increased thruster thrust-to-power is not sufficient to warrant the increased power used to drive the DBD. However, at higher thrust levels, which is where EAD devices operate, the decoupled thruster simultaneously shows an improvement in both thrust-to-power and maximum achievable thrust. For example, 160 mN/m can be achieved at 5.4 N/kW, compared to 140 mN/m at 5 N/kW for the corona discharge system.

The above experiments confirm that the disclosed electrodynamic devices can break the thrust and thrust-to-power limitations of existing corona discharge based devices. Specifically, these devices produce more thrust at higher thrust-to-power. Additionally, while separate ionization incurs a penalty in power draw, this is more than offset by improvements in thrust-to-power, particularly at high thrust levels relevant for electrodynamic propulsion. With further optimization and reduction in power of the DBD ionization stage, it is expected that decoupled thrusters have the potential to increase the flight performance of aircraft including electrodynamic thrusters.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks using any appropriate wireless communication protocol (e.g. WiFi, Zigbee, Bluetooth, radio, NFC, or other appropriate protocol), wired networks, or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An electroaerodynamic device comprising:
a first electrode;
a second electrode spaced from the first electrode, wherein the first electrode and the second electrode are configured to form ions between the first electrode and the second electrode;
a fluid-filled gap disposed between the first electrode and the second electrode; and
a third electrode located downstream from the first electrode and the second electrode,
wherein the third electrode is configured to accelerate the ions in a downstream direction to generate a thrust for propulsion and
wherein the first electrode is coated with a dielectric material and the second electrode is free of the dielectric material.

2. The electroaerodynamic device of claim 1, wherein the first and second electrodes are configured to form the ions by dielectric barrier discharge.

3. The electroaerodynamic device of claim 2, wherein the third electrode is configured to apply a voltage differential between the third electrode and the first and/or second electrodes to accelerate the ions in the downstream direction.

4. The electroaerodynamic device of claim 1, wherein the first electrode and the second electrode are elongated and extend in a first direction parallel to each other.

5. The electroaerodynamic device of claim 4, wherein the third electrode is elongated and extends in the first direction parallel with the first and second electrodes.

6. The electroaerodynamic device of claim 1, wherein a voltage of the third electrode during operation is substantially constant.

7. A method of accelerating a fluid, the method comprising:
forming ions in a fluid-filled gap disposed between a first electrode and a second electrode using dielectric barrier discharge; and
accelerating the ions in a downstream direction to produce a thrust for propulsion,
wherein the first electrode is coated with a dielectric material and the second electrode is free of the dielectric material.

8. The method of claim 7, wherein forming the ions includes applying a first time varying voltage differential between the first electrode and the second electrode.

9. The method of claim 8, wherein accelerating the ions in the downstream direction includes applying a second voltage differential between a third electrode and the first and second electrodes, wherein the third electrode is located downstream from the first and second electrodes.

10. The method of claim 9, further comprising varying the first time varying voltage differential to vary the produced thrust.

11. The method of claim 9, further comprising varying the second voltage differential to vary the produced thrust.

12. An electroaerodynamic device comprising:
a first electrode, wherein the first electrode is coated with a dielectric material;
a second electrode spaced from the first electrode, wherein the second electrode is free of the dielectric material;
a fluid-filled gap disposed between the first electrode and the second electrode;
a third electrode located downstream from the first electrode and the second electrode and configured to accelerate ions formed by the first and second electrodes and to produce a thrust for propulsion;
a first power source configured to apply a first time varying voltage differential between the first electrode and the second electrode;
a second power source configured to apply a second voltage differential between the third electrode and the first and/or second electrodes.

13. The electroaerodynamic device of claim 12, wherein the first and second electrodes form ions by dielectric barrier discharge when the first time varying voltage differential is applied.

14. The electroaerodynamic device of claim 13, wherein the third electrode accelerates the ions in a downstream direction when the second voltage differential is applied.

15. The electroaerodynamic device of claim 12, wherein the first electrode and the second electrode are elongated and extend in a first direction parallel to each other.

16. The electroaerodynamic device of claim 15, wherein the third electrode is elongated and extends in the first direction parallel with the first and second electrodes.

17. The electroaerodynamic device of claim 12, wherein the first power source is configured to vary the first time varying voltage differential to vary the thrust produced by the electroaerodynamic device.

18. The electroaerodynamic device of claim 12, wherein the second power source is configured to vary the second voltage differential to vary the thrust produced by the electroaerodynamic device.

* * * * *